United States Patent
Topsoe et al.

[11] Patent Number: 6,059,995
[45] Date of Patent: May 9, 2000

[54] PROCESS AND PREPARATION OF HYDROGEN-RICH GAS

[75] Inventors: Haldor F. A. Topsoe, Vedæk; Ib Dybkjær, Copenhagen; Poul Erik Nielsen, Fredensborg; Bodil Voss, Virum, all of Denmark

[73] Assignee: Haldor Topsoe A/S, Lyngby, Denmark

[21] Appl. No.: 09/233,116

[22] Filed: Jan. 19, 1999

Related U.S. Application Data

[60] Provisional application No. 60/072,074, Jan. 21, 1998.

[51] Int. Cl.$^7$ ............................. C07C 1/02; C01B 31/18; C01B 31/20; C01B 3/02
[52] U.S. Cl. .................. 252/373; 423/418.2; 423/437.1; 423/648.1
[58] Field of Search ............................ 423/648.1, 437.1, 423/418.2; 252/373

[56] References Cited

U.S. PATENT DOCUMENTS 5,837,217  11/1998  Nielsen et al. ...................... 423/648.1

FOREIGN PATENT DOCUMENTS 04349102  12/1992  Japan .

*Primary Examiner*—Paul J. Killos
*Assistant Examiner*—J. Parsa
*Attorney, Agent, or Firm*—Ostrolenk, Faber, Gerb & Soffen, LLP

[57] ABSTRACT

A process for the production of hydrogen rich gas from a feedstock containing dimethyl ether and/or methanol by steam reforming dimethyl ether in presence of a reforming catalyst to a product gas being rich in hydrogen, wherein necessary heat for the endothermic steam reforming reactions is supplied through oxidation of part of the hydrogen contained in the steam reformed feedstock process in heat conducting relationship with the steam reforming reactions.

10 Claims, 2 Drawing Sheets

PROCESS AND PREPARATION OF HYDROGEN-RICH GAS

This application claims the benefit of U.S. provisional application Ser. No. 60/072,074, filed on Jan. 21, 1998.

BACKGROUND OF THE INVENTION

1. Field of the Invention

The present invention relates to the preparation of hydrogen-rich gas from a feedstock containing dimethylether (DME) and/or methanol (MeOH) by adiabatic catalytic steam reforming in presence of an oxygen containing atmosphere.

2. Description of the Related Art

It is known from EP-A-0 761 942 and EP-A-0 754 649 to reform DME to hydrogen and carbon monoxide rich gases in presence of solid acid catalysts. The reactions proceeding during steam reforming of DME are:

$$CH_3OCH_3 + H_2O \rightleftharpoons 2CH_3OH \quad (1)$$

$$2CH_3OH + 2H_2O \rightleftharpoons CO_2 + 6H_2 \quad (2)$$

$$CO_2 + H_2 \rightleftharpoons CO + H_2O \quad (3)$$

The above reactions are endothermic and require heat for reasonable reactions rates. By the process described in the above EP-A-0 761 942 heat is supplied by hot exhaust gas from a gas turbine. It is further known from WO 98/18572 to catalytically hydrolyse DME with steam in heat conducting relationship with the exothermic water-gas shift reaction.

SUMMARY OF THE INVENTION

It has now been found that DME may adiabatically be steam reformed, when carrying out the reaction in heat conducting relationship with partial oxidation reaction of part of hydrogen formed during steam reforming of DME/MeOH.

Based on the above finding, the present invention provides a process for the production of hydrogen rich gas from a feedstock containing dimethyl ether and/or methanol by steam reforming dimethyl ether and/or methanol in presence of a reforming catalyst to a product gas being rich in hydrogen, wherein necessary heat for the endothermic steam reforming reactions is supplied through oxidation of part of hydrogen in the steam reformed feedstock in heat conducting relationship with the steam reforming reactions.

The above steam reforming reactions and partial oxidation of hydrogen in series and are carried out in one or more catalyst zones arranged operated adiabatically. When employing a single catalyst zone, it is preferred to employ a catalyst with combined activity for the aforementioned DME and MeOH steam reforming reactions and the oxidation of hydrogen. Useful catalysts of the above type may be solid acids including zeolitic materials, alumina silicates, silica alumina, alumina and mixtures thereof, combined with a methanol decomposition catalyst, e.g. Cu, or Cu—Zn—alumina in a weight ratio of preferably between 1:5 and 5:1, coated with silica and shell impregnated with one or more noble metals e.g. platinum and/or palladium according to conventional catalyst manufacturing procedure. Such type of catalyst with combined steam reforming and oxidation activity will preferably be used in a fluid bed reactor, wherein a process stream of DME and/or methanol, steam and oxygen containing atmosphere will be introduced at the bottom of the reactor.

Alternatively, the inventive process may be performed in a quench type adiabatic reformer or adiabatic heat exchange reformer with a number of fixed bed catalyst layers of a DME and/or methanol reforming catalyst as described above and intermediate beds of an oxidation catalyst.

When employing a quench type reformer, preheated process gas of DME and/or methanol and steam is introduced in a first bed with the reforming catalyst and partially converted to a gas containing hydrogen. A part of the hydrogen is then oxidized with oxygen containing atmosphere being introduced into the partial reformed process gas from the top catalyst bed and oxidized in a bed of oxidation catalyst arranged between the top catalyst bed and a subsequent fixed bed of reforming catalyst. Heat evolving from the exothermic oxidation reaction proceeding in the oxidation catalyst bed is, thereby, transferred to the reacting process gas in an amount sufficient to maintain the endothermic reforming reactions in subsequent reforming catalyst bed.

The oxygen containing atmosphere may be added to the process gas in several steps, whereby each step is performed as described above.

The oxygen containing atmosphere for use in the inventive process, may be any atmosphere containing oxygen in an amount sufficient to the oxidation of the required amount of hydrogen in order to provide the necessary heat for the endothermic reforming reactions at a reasonable reaction rate.

The oxygen containing atmosphere may be pure oxygen, oxygen-enriched air, or oxygen depleted air.

An advantage by using air or oxygen depleted air in the above process will be that valuable ammonia synthesis gas is produced in the process.

As further an advantage of the above process, carbon dioxide recovered from the effluent stream of the process may be utilized in the preparation of urea by to the known urea process schemes.

BRIEF DESCRIPTION OF THE DRAWINGS

The above features and advantages of the invention will be further apparent from the following description, disclosing in detail specific embodiments of the invention by reference to the drawings, in which.

DETAILED DESCRIPTION OF THE PREFERRED EMBODIMENT

Figure 1:
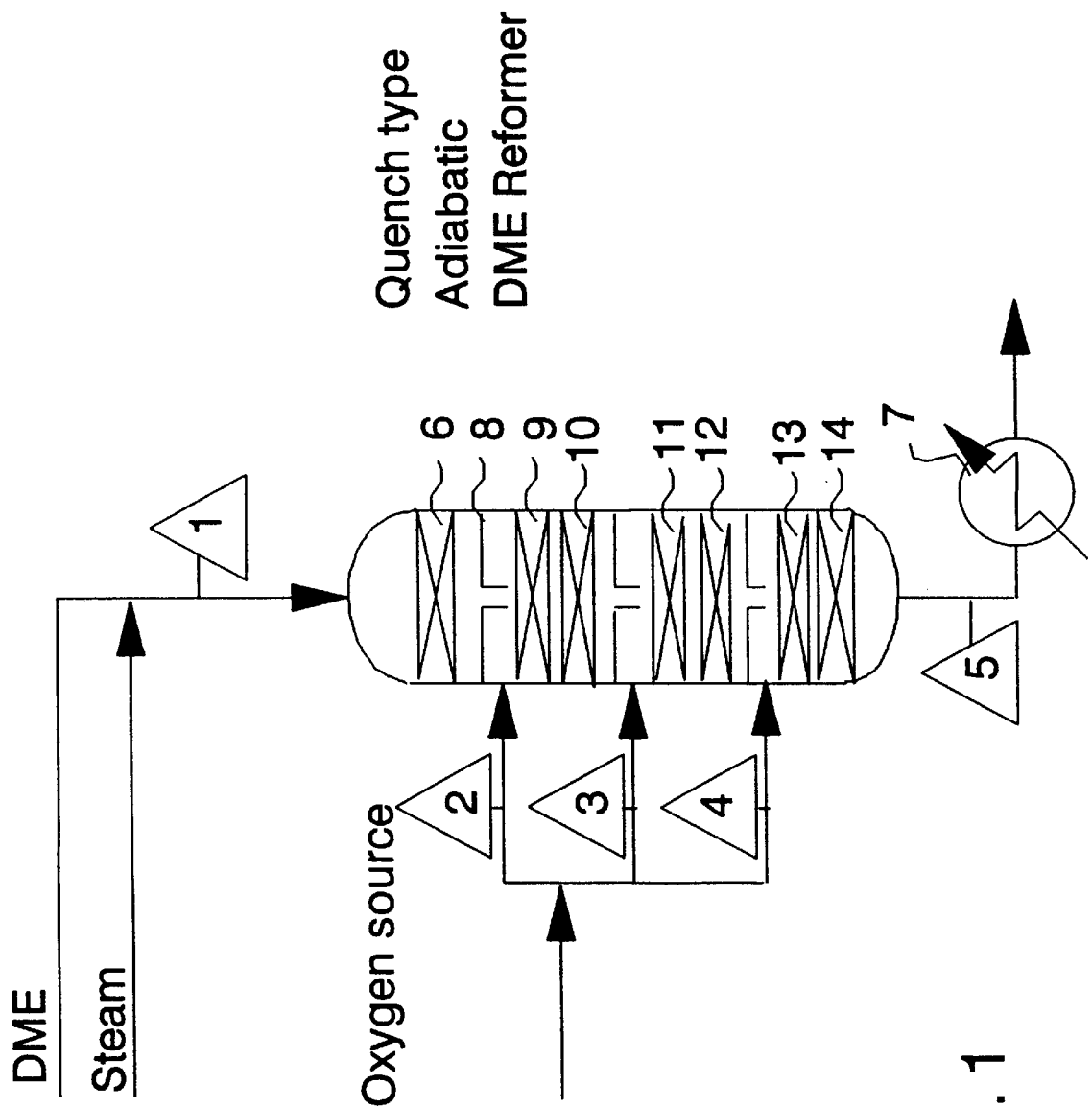
FIG. 1 shows a simplified flow sheet of a process for the preparation of ammonia synthesis gas from DME feedstock steam by reforming in an adiabatic DME reformer according to a specific embodiment of the invention.

In the reformer shown in FIG. 1, feedgas of DME and steam is introduced into a first bed 6 of DME reforming catalyst. The feedgas is preheated to about 270° C., optionally by heat supplied from the reformed feedgas 5 in heat exchanger 7.

By passage through bed 6, the feedgas is partially reformed to a hydrogen containing process gas. The process gas is mixed with a first stream of air 2 in a mixer 8 and a part of the hydrogen content in the process gas oxidized in oxidation catalyst bed 9. Heat evolving during the oxidation reaction is, thereby, transferred to the reacting process gas, which is further reformed in DME reforming catalyst bed 10.

Further heat is then supplied to the reacting process gas through oxidation of a part of hydrogen in oxidation catalyst bed 11 and 13 with air supplied through line 3 and 4, respectively. The process gas is then further reformed in catalyst bed 12 and 14 to final product gas 5.

Figure 2:
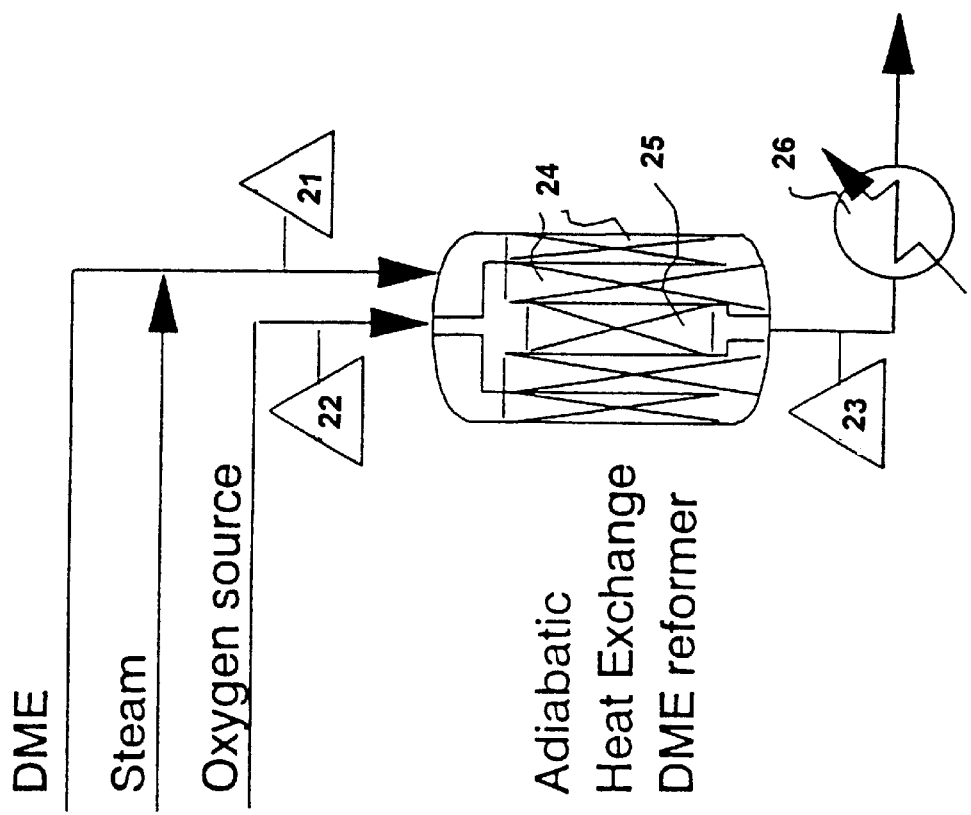
FIG. 2 a similar process carried out in an adiabatic heat exchange DME reformer according to a further embodiment of the invention.

In the heat exchange DME reformer shown in FIG. 2 a DME and steam containing feed stream 21 is similar to the above process reformed to hydrogen containing process gas with heat supplied by oxidation of part of the hydrogen content in the process gas. In contrast to the above process, shown in FIG. 1, the feed gas is in the heat exchange reformer of FIG. 2 reformed in one step by passage through catalyst bed 24 being in indirect heat exchange with oxidation reactions of part of the hydrogen contained in the reacted process gas in oxidation catalyst bed 25. Similar to the above process shown in FIG. 1 the feed gas may be preheated with heat contained in product gas 23 by heat exchange in heat exchanger 26.

The actual gas composition and process parameters used in the above described processes are summarized in the Table below, in which position numbers correspond to the reference numbers in the figures.

TABLE 1

| FIG. 1 | | | | | |
|---|---|---|---|---|---|
| Position | 1 | 2 | 3 | 4 | 5 |
| Pressure [ato] | 34 | 33 | 33 | 33 | 31.5 |
| Temperature [° C.] | 350 | 166 | 166 | 166 | 458 |
| Flow rate [kmol/h] | 7707 | 894 | 669 | 808 | 13979 |
| Composition | | | | | |
| $O_2$ | | 20.85 | 20.85 | 20.85 | |
| $H_2$ | | | | | 39.58 |
| $H_2O$ | 85.71 | 0.56 | 0.56 | 0.56 | 31.34 |
| $N_2$ | | 77.63 | 77.63 | 77.63 | 13.16 |
| CO | | | | | 0.52 |
| $CO_2$ | | 0.03 | 0.03 | 0.03 | 15.21 |
| Ar | | 0.94 | 0.94 | 0.94 | 0.16 |
| MeOH | | | | | 0.03 |
| DME | 14.29 | | | | |

| FIG. 2 | | | |
|---|---|---|---|
| Position | 1 | 2 | 3 |
| Pressure [ato] | 39 | 39 | 37.5 |
| Temperature [° C.] | 269 | 173 | 350 |
| Flow rate [kmol/h] | 11047 | 2488 | 17615 |
| Composition | | | |
| $O_2$ | | 20.86 | |
| $H_2$ | | | 32.78 |
| $H_2O$ | 89.58 | 0.49 | 43.05 |
| $N_2$ | | 77.69 | 10.97 |
| CO | | | 0.49 |
| $CO_2$ | | 0.03 | 12.56 |
| Ar | | 0.94 | 0.13 |
| MeOH | | | 0.01 |
| DME | 10.42 | | |

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A process for the production of hydrogen rich gas from a process gas containing dimethyl ether and/or methanol, the process comprising the steps of:

steam reforming the dimethyl ether and/or methanol in presence of a reforming catalyst to a product gas being rich in hydrogen; and contacting the product gas being rich in hydrogen with a noble metal catalyst to catalytically oxidize a part of the hydrogen in the product gas so as to generate heat;

wherein necessary heat for the endothermic steam reforming reactions is supplied adiabatically from the heat generated by the catalytic oxidation of the part of the hydrogen contained in the steam reformed product gas through a heat conducting relationship with the steam reforming reactions.

2. The process of claim 1, wherein the reforming catalyst comprises a solid acid.

3. The process of claim 1, wherein the reforming catalyst consists of a mixture of a solid acid and a methanol reforming catalyst coated with silica and shell impregnated with one or more noble metals.

4. The process of claim 1, wherein the oxygen containing atmosphere consists of air, oxygen depleted or enriched air.

5. The process of claim 4, wherein the product gas is passed to an ammonia synthesis process.

6. The process of claim 1, wherein the steps are performed at constant temperature and pressure.

7. The process of claim 1, wherein the process is carried out at elevated pressures in the range of 31.5 to 39 atmospheres.

8. A process for the production of hydrogen rich gas from a process gas containing dimethyl ether and/or methanol by steam reforming dimethyl ether in presence of a reforming catalyst to a product gas being rich in hydrogen, the process comprising the steps of:

contacting a feedstock of steam and DME and/or methanol with a steam reforming catalyst to produce a hydrogen-enriched process stream; and processing the hydrogen-enriched process stream adiabatically through a series of a least two catalyst beds to further enrich the hydrogen content of the process stream and thereby produce the hydrogen-enriched product gas, the process at each of the catalyst beds comprising the steps of:

admixing the hydrogen-enriched process stream with an oxygen-containing gas to produce an oxygen-containing process stream;

contacting the oxygen-containing process stream with a noble metal to catalytically oxidize a portion of the hydrogen in the oxygen-containing process stream and thereby produce a heated process stream; and contacting the heated process stream with a steam-reforming catalyst to produce hydrogen.

9. The process of claim 8, wherein the step of processing the hydrogen-enriched process stream adiabatically through a series of a least two catalyst beds is conducted at constant temperature and pressure.

10. The process of claim 8, wherein the step of processing the hydrogen-enriched process stream is carried out at elevated pressures in the range of 31.5 to 39 atmospheres.

* * * * *